(12) United States Patent
Tanaka

(10) Patent No.: US 11,971,288 B2
(45) Date of Patent: Apr. 30, 2024

(54) LEVEL METER AND METHOD OF SETTING THE LEVEL METER

(71) Applicant: PATLITE CORPORATION, Osaka (JP)

(72) Inventor: Hiroki Tanaka, Osaka (JP)

(73) Assignee: PATLITE CORPORATION, Osaka (JP)

( * ) Notice: Subject to any disclaimer, the term of this patent is extended or adjusted under 35 U.S.C. 154(b) by 0 days.

(21) Appl. No.: 17/642,921

(22) PCT Filed: Oct. 29, 2020

(86) PCT No.: PCT/JP2020/040617
§ 371 (c)(1),
(2) Date: Mar. 14, 2022

(87) PCT Pub. No.: WO2022/091292
PCT Pub. Date: May 5, 2022

(65) Prior Publication Data
US 2024/0044687 A1 Feb. 8, 2024

(51) Int. Cl.
*G01F 23/00* (2022.01)
(52) U.S. Cl.
CPC ................. *G01F 23/0007* (2013.01)
(58) Field of Classification Search
CPC .................................................. G01F 23/0007
See application file for complete search history.

(56) References Cited

U.S. PATENT DOCUMENTS

| 5,585,786 | A | * | 12/1996 | Clark | ................... | G01F 23/706 |
| | | | | | | 340/623 |
| 5,705,747 | A | | 1/1998 | Bailey | | |
| 6,345,214 | B1 | | 2/2002 | Dulphy-Vigor et al. | | |
| 7,389,688 | B1 | * | 6/2008 | Vander Horst | ......... | G01F 23/02 |
| | | | | | | 73/299 |

(Continued)

FOREIGN PATENT DOCUMENTS

| DE | 102019109182 A1 | 10/2019 |
| DE | 102018118691 A1 | 2/2020 |
| EP | 2996442 A1 | 3/2016 |

(Continued)

*Primary Examiner* — Eric S. McCall
(74) *Attorney, Agent, or Firm* — Rabin & Berdo, P.C.

(57) ABSTRACT

A level meter includes light emission segments forming an emission region, a register portion to register a default emission condition and an emission-condition specified value, and a control portion. The control portion controls the light emission so that the emission region spreads in an emission proceeding direction according to an increase in numerical quantity to be expressed. An emission-condition specified value indicates a command to apply a predetermined specified emission condition concerning a subsequent segment positioned on a more upstream side than a foremost segment positioned on a most downstream side in the emission proceeding direction. The control portion allows all the light emission segments forming the emission region to emit light based on the default emission condition, and the control portion allows the foremost segment to emit light based on the default emission condition whereas allowing the subsequent segment to emit light based on the specified emission condition.

17 Claims, 7 Drawing Sheets

(56) References Cited

U.S. PATENT DOCUMENTS

2016/0109278 A1 4/2016 Morris
2016/0351024 A1 12/2016 Shigematsu

FOREIGN PATENT DOCUMENTS

| JP | 2663738 B2 | 10/1997 |
| JP | H11-72367 A | 3/1999 |
| JP | 2001-292909 A | 10/2001 |
| JP | 2008-224612 A | 9/2008 |
| JP | 2018-098004 A | 6/2018 |
| WO | 2014/181423 A1 | 11/2014 |

* cited by examiner

FIG. 4

```
Light emission preparation
    process start
         │
         ▼
S1  Obtain position of foremost segment
         │
         ▼
S2  Obtain default emission condition of
    foremost segment and default emission
    condition of subsequent segment
         │
         ▼
S3  Set obtained emission condition in buffer
         │
         ▼
       S4 ◇ Emission mode is
            first emission mode?
         │
      YES ├──────────────────────────┐
         │ NO                        │
         ▼                           │
       S5 ◇ Emission mode is         │
            second emission mode?    │
         │                           │
      YES ├──────NO──────┐           │
         ▼               ▼           │
S6  Overwrite emission   S7 Overwrite emission pattern of
    condition on buffer about   emission conditions on buffer
    subsequent segment with     about subsequent segment
    default emission condition  with "Lighting"
    of foremost segment
         │               │           │
         └───────┬───────┘           │
                 ▼                   │
          Light emission preparation ◄┘
              process end
```

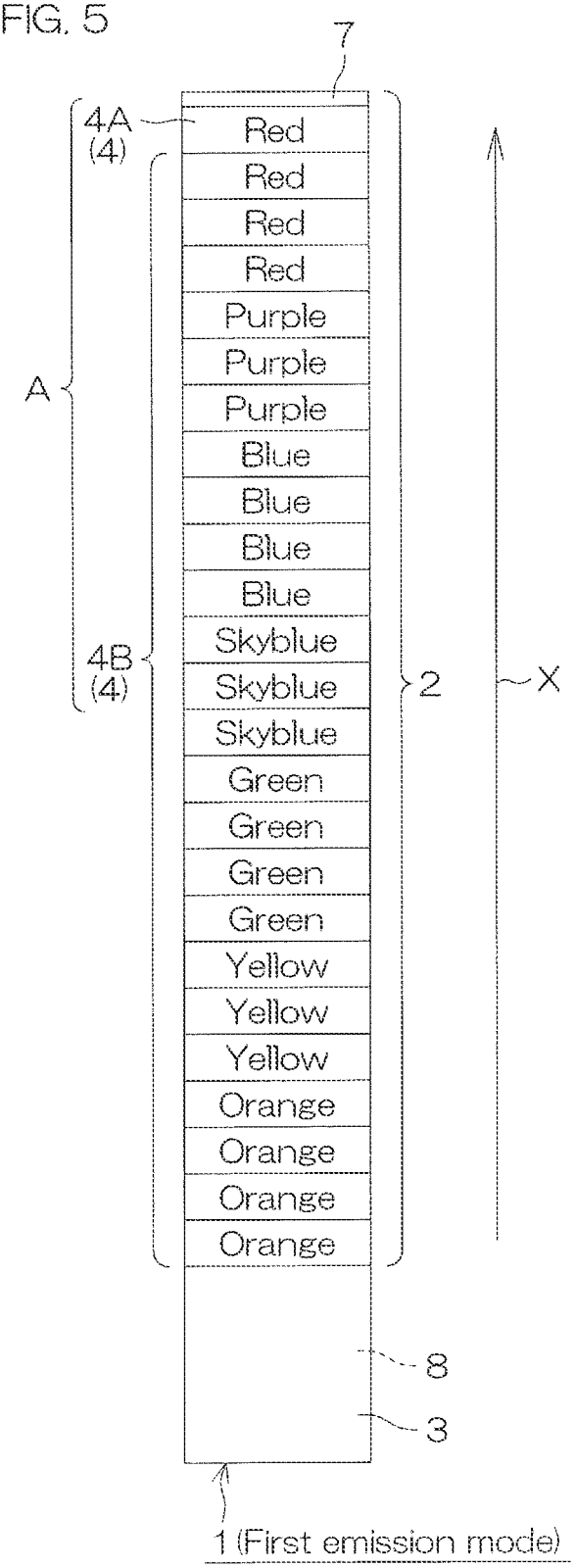

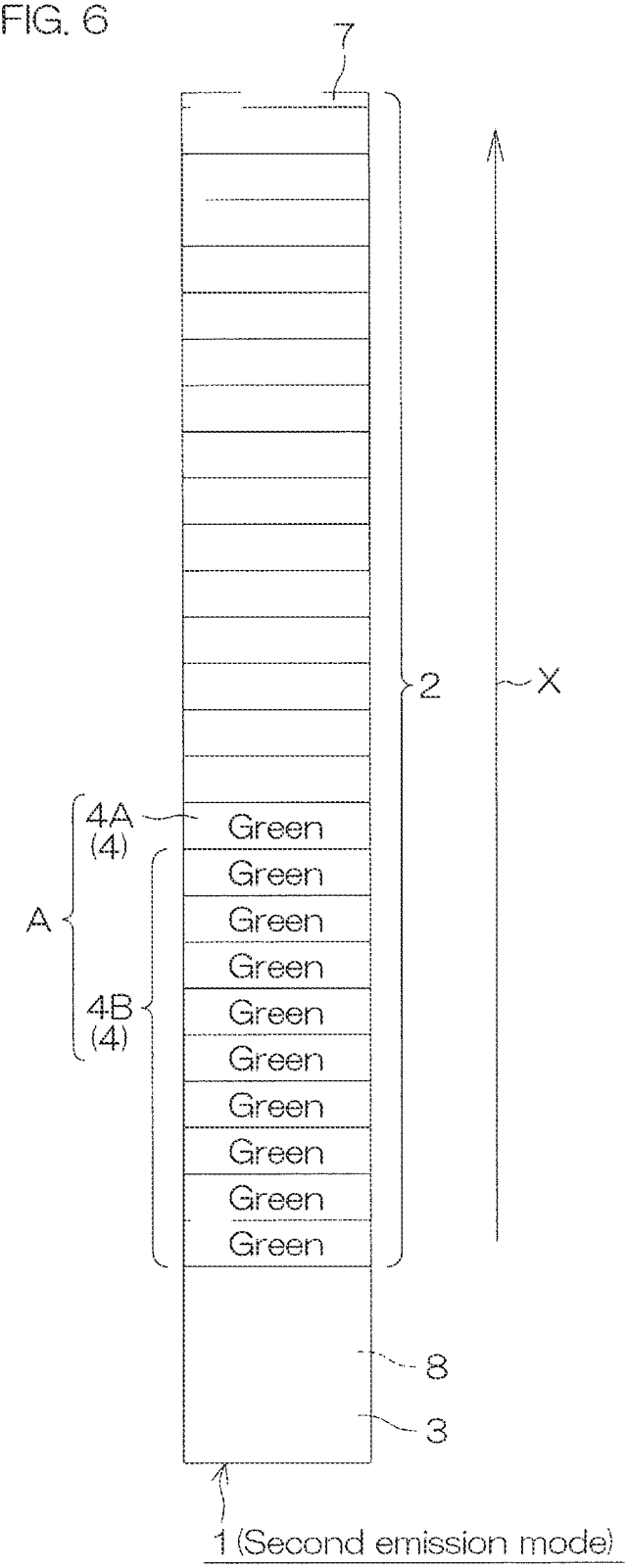

LEVEL METER AND METHOD OF SETTING THE LEVEL METER

TECHNICAL FIELD

The present invention relates to a level meter and a method of setting the level meter.

BACKGROUND ART

Patent Literature 1 discloses a level meter that is used to visually display a quantity of liquid in a liquid tank. The level meter includes a base portion and a plurality of light emission sections that are arranged in a line in an up-down direction on the base portion. Each of the light emission sections includes a light source and a glove with which the light source is covered. The glove is made of a colored translucent material. The glove of a light emission section belonging to a lower group on the base-portion side among the light emission sections is green, and the glove of a light emission section belonging to an intermediate group placed at a higher position than the lower group among the light emission sections is yellow, and the glove of a light emission section belonging to an upper group placed at a higher position than the intermediate group among the light emission sections is red. When the light source is turned on, light of the light source passes through the glove, and, as a result, the light emission section emits light in the same emission color as the color of the glove. A user can know the quantity of liquid in the liquid tank by seeing and understanding how many light emission sections emit light in order from the lowest light emission section.

CITATION LIST

Patent Literature

Patent Literature 1: Japanese Patent No. 2663738

SUMMARY OF INVENTION

Technical Problem

In the level meter of Patent Literature 1, the light emission color of each of the light emission sections is a predetermined single emission color, and the light emission pattern of each of the light emission sections is only "lighting," and therefore the number of light emission variations that can be expressed by the level meter is small.

Therefore, one preferred embodiment of the present invention provides a level meter that is capable of realizing abundant light emission variations, and provides a method of setting the level meter.

Solution to Problem

One preferred embodiment of the present invention provides a level meter including a plurality of light emission segments, a first register portion in which a default emission condition concerning each of the light emission segments is registered, a second register portion in which an emission-condition specified value is registered, and a control portion that controls light emission of the light emission segment on a basis of registration contents of the first and second register portions. The light emission segments are arranged in a predetermined array direction and form an emission region by allowing at least one light emission segment to emit light. When the emission region is formed by allowing at least two of the light emission segments consecutively arranged in the array direction to emit light, the emission-condition specified value is a command value that indicates a command to apply a predetermined specified emission condition without applying the default emission condition concerning a subsequent segment positioned on a more upstream side in a predetermined emission proceeding direction than a foremost segment positioned on a most downstream side in the emission proceeding direction in the at least two light emission segments forming the emission region. The control portion controls light emission of the light emission segment so that the emission region moves or spreads in the emission proceeding direction along the array direction in accordance with an increase or a decrease in numerical quantity to be expressed by the emission region. The control portion allows all of the light emission segments forming the emission region to emit light on a basis of the default emission condition. The control portion allows the foremost segment to emit light on a basis of the default emission condition while allowing the subsequent segment to emit light on a basis of the specified emission condition.

With this arrangement, the control portion moves or spreads the emission region in the emission proceeding direction while controlling the light emission of the light emission segment, thereby enabling the level meter to express an increase or a decrease in to-be-expressed numerical quantity. In that case, the level meter is enabled to allow all of the light emission segments forming the emission region to emit light on the basis of the default emission condition registered in the first register portion concerning each of the light emission segments. For convenience, this operational mode, i.e., the emission mode of a light emission segment forming an emission region is hereinafter referred to as "first emission mode." This first emission mode may be regarded as a default emission mode. Additionally, the level meter is enabled to allow a plurality of light emission segments (at least two light emission segments) forming an emission region to emit light in an emission mode (for convenience, hereinafter referred to as "different mode") differing from the first emission mode. In detail, the foremost segment on the most downstream side in the emission proceeding direction of the at least two light emission segments forming the emission region is allowed to emit light on the basis of the default emission condition, whereas the subsequent segment on the more upstream side than the foremost segment is allowed to emit light on the basis of the specified emission condition according to the emission-condition specified value registered in the second register portion. As thus described, the level meter is enabled to allow the light emission segments forming the emission region to emit light in a plurality of emission modes, thus making it possible to realize abundant light-emission variations.

In one preferred embodiment of the present invention, if the emission-condition specified value is not yet registered in the second register portion, the control portion allows all of the light emission segments forming the emission region to emit light on a basis of the default emission condition. If the emission-condition specified value is registered in the second register portion, the control portion allows the foremost segment to emit light on a basis of the default emission condition whereas the control portion allows the subsequent segment to emit light on a basis of the specified emission condition.

With this arrangement, the level meter when the emission-condition specified value is not yet registered in the second register portion is enabled to allow the light emission segments forming the emission region to emit light in the first emission mode. On the other hand, the level meter when the emission-condition specified value is registered in the second register portion is enabled to allow the light emission segments forming the emission region to emit light in the different mode. Therefore, the level meter is enabled to realize abundant light-emission variations, and a user can select an emission mode by registering the emission-condition specified value in the second register portion or by bringing it into a not-yet-registered state.

In one preferred embodiment of the present invention, the specified emission condition is determined depending on the default emission condition registered in the first register portion concerning the foremost segment.

With this arrangement, in the different mode, the foremost segment is allowed to emit light on the basis of the default emission condition whereas the subsequent segment is allowed to emit light on the basis of the specified emission condition depending on the default emission condition of the foremost segment. The specified emission condition depending on the default emission condition may be the same as the default emission condition, or may differ from the default emission condition. The different mode (for convenience, hereinafter referred to as the "second emission mode") when the specified emission condition is the same as the default emission condition is an emission mode in which all of the foremost segment and the subsequent segments are allowed to emit light on the basis of the default emission condition of the foremost segment. The different mode (for convenience, hereinafter referred to as the "third emission mode") when the specified emission condition differs from the default emission condition is an emission mode in which the foremost segment is allowed to emit light on the basis of the default emission condition whereas the subsequent segment is allowed to emit light on the basis of an emission condition differing from the default emission condition of the foremost segment. As thus described, the level meter is enabled to allow the light emission segments forming the emission region to emit light not only in the first emission mode but also in the second or third emission mode, thus making it possible to realize abundant light-emission variations.

In one preferred embodiment of the present invention, a first emission-condition specified value indicating to use the default emission condition registered in the first register portion concerning the foremost segment as the specified emission condition is registerable in the second register portion. If the first emission-condition specified value is registered in the second register portion, the control portion sets, as the specified emission condition, the default emission condition registered in the first register portion concerning the foremost segment of the at least two light emission segments forming the emission region.

With this arrangement, if the first emission-condition specified value is registered in the second register portion, the emission mode of the light emission segments forming the emission region becomes the second emission mode mentioned above. Therefore, the level meter is enabled to realize abundant light-emission variations, and a user can select the second emission mode by registering the first emission-condition specified value in the second register portion.

In one preferred embodiment of the present invention, the light emission segment is configured to emit light in a plurality of emission colors and in a plurality of emission patterns. Each of the default emission condition and the specified emission condition includes emission color specification and emission pattern specification.

With this arrangement, the second emission mode becomes an emission mode in which all of the foremost segment and the subsequent segments forming the emission region are allowed to emit light in a default emission color and in a default emission pattern concerning the foremost segment.

In one preferred embodiment of the present invention, a second emission-condition specified value indicating to use an emission condition differing from the default emission condition registered in the first register portion concerning the foremost segment as the specified emission condition is registerable as the emission-condition specified value in the second register portion. If the second emission-condition specified value is registered in the second register portion, the control portion sets, as the specified emission condition, an emission condition differing from the default emission condition registered in the first register portion concerning the foremost segment of the at least two light emission segments forming the emission region.

With this arrangement, if the second emission-condition specified value is registered in the second register portion, the emission mode of the light emission segments forming the emission region becomes the third emission mode mentioned above. Therefore, the level meter is enabled to realize abundant light-emission variations, and a user can select the third emission mode by registering the second emission-condition specified value in the second register portion.

In one preferred embodiment of the present invention, the light emission segment is configured to emit light in a plurality of emission colors and in a plurality of emission patterns. Each of the default emission condition and the specified emission condition includes emission color specification and emission pattern specification. The control portion sets, as the specified emission condition, an emission condition, in which at least one of an emission color and an emission pattern differs from an emission color and an emission pattern that are specified by the default emission condition registered in the first register portion concerning the foremost segment.

With this arrangement, the third emission mode mentioned above becomes an emission mode in which the foremost segment of at least two light emission segments forming an emission region is allowed to emit light in a default emission color and in a default emission pattern concerning the foremost segment and in which the subsequent segment is allowed to emit light on an emission condition in which at least one of the emission color and the emission pattern is different from the default emission condition concerning the foremost segment.

In one preferred embodiment of the present invention, the level meter further includes a third register portion in which a number of the light emission segments forming the emission region is registered.

With this arrangement, a user can set the number of light emission segments forming an emission region by registering the number of light emission segments forming an emission region in the third register portion. Hence, the emission region is enabled to be formed by various numbers of light emission segments, and therefore it is possible to provide a level meter capable of realizing more abundant light-emission variations.

In one preferred embodiment of the present invention, the level meter further includes a fourth register portion in which the emission proceeding direction is registered.

With this arrangement, a user can set the emission proceeding direction by registering the emission proceeding direction in the fourth register portion. Hence, the emission region that moves or spreads in various emission proceeding directions is enabled to be formed, and therefore it is possible to provide a level meter capable of realizing more abundant light-emission variations.

In one preferred embodiment of the present invention, a level display unit including the light emission segments united together and a control unit including the first register portion, the second register portion, and the control portion may be joined integrally with each other.

In one preferred embodiment of the present invention, a level display unit including the light emission segments united together and a control unit including the first register portion, the second register portion, and the control portion may be separated from each other, and the level display unit and the control unit may be communicably connected to each other.

Additionally, one preferred embodiment of the present invention provides a method of setting a level meter that includes a plurality of light emission segments that are arranged in a predetermined array direction and that form an emission region by allowing at least one light emission segment to emit light, a register portion in which an emission condition of the light emission segments is registered, and a control portion that controls light emission of the light emission segment on a basis of registration contents of the register portion so that the emission region moves or spreads in a predetermined emission proceeding direction along the array direction in accordance with an increase or a decrease in numerical quantity to be expressed by the emission region. The method of setting the level meter includes a first registration step in which a default emission condition concerning each of the light emission segments is registered in the register portion and a second registration step. In the second registration step, when the emission region is formed by allowing at least two of the light emission segments consecutively arranged in the array direction to emit light, an emission-condition specified value that indicates a command to apply a predetermined specified emission condition without applying the default emission condition is registered in the register portion concerning a subsequent segment positioned on a more upstream side in the emission proceeding direction than a foremost segment positioned on a most downstream side in the emission proceeding direction in the at least two light emission segments forming the emission region.

With this arrangement, the control portion moves or spreads the emission region in the emission proceeding direction while controlling the light emission of the light emission segment, thereby enabling the level meter to express an increase or a decrease in numerical quantity. The default emission condition concerning each of the light emission segments is enabled to be registered in the register portion of the level meter. The level meter in which the default emission condition has been registered in the register portion is enabled to allow all of the light emission segments forming the emission region to emit light on the basis of the default emission condition registered in the register portion concerning each of the light emission segments. For convenience, this operational mode, i.e., the emission mode of a light emission segment forming an emission region is hereinafter referred to as the "first emission mode." This first emission mode may be regarded as a default emission mode. Additionally, the emission-condition specified value is enabled to be registered in the register portion of the level meter. The level meter in which the emission-condition specified value has been registered in the register portion is enabled to allow a plurality of light emission segments (at least two light emission segments) forming an emission region to emit light in an emission mode (for convenience, hereinafter referred to as the "different mode") differing from the first emission mode. In detail, the foremost segment on the most downstream side in the emission proceeding direction of the at least two light emission segments forming the emission region is allowed to emit light on the basis of the default emission condition, whereas the subsequent segment on the more upstream side in the emission proceeding direction than the foremost segment is allowed to emit light on the basis of the specified emission condition according to the emission-condition specified value registered in the second register portion. Thus, the level meter is enabled to allow the light emission segments forming the emission region to emit light in a plurality of emission modes. Therefore, it is possible to provide a setting method capable of realizing abundant light-emission variations by means of the level meter.

In one preferred embodiment of the present invention, the light emission segment is configured to emit light in a plurality of emission colors and in a plurality of emission patterns, and each of the default emission condition and the specified emission condition includes emission color specification and emission pattern specification.

With this arrangement, the default emission color and the default emission pattern concerning each of the light emission segments are registerable in the register portion of the level meter, and therefore the level meter is enabled to allow all of the light emission segments forming the emission region in the first emission mode to emit light in the default emission color and in the default emission pattern concerning each of the light emission segments. The level meter in which the emission-condition specified value has been registered in the register portion is enabled to allow the foremost segment of the light emission segments forming the emission region in the different mode to emit light in the default emission color and in the default emission pattern concerning the foremost segment whereas the level meter is enabled to allow the subsequent segment to emit light in the emission color and in the emission pattern in the specified emission condition according to the emission-condition specified value. Therefore, it is possible to realize abundant light-emission variations by means of the level meter.

In one preferred embodiment of the present invention, in the second registration step, a first emission-condition specified value indicates to use the default emission condition registered in the register portion concerning the foremost segment as the specified emission condition is registered as the emission-condition specified value in the register portion.

With this arrangement, if a user registers the first emission-condition specified value in the register portion, an example (for convenience, hereinafter referred to as the "second emission mode") concerning the different mode becomes an emission mode in which all of the foremost segment and the subsequent segments forming the emission region are allowed to emit light on the basis of the default emission condition of the foremost segment. Therefore, it is possible to realize abundant light-emission variations by means of the level meter, and a user can select the second emission mode by registering the first emission-condition specified value in the register portion.

In one preferred embodiment of the present invention, in the second registration step, a second emission-condition specified value indicating to use an emission condition differing from the default emission condition registered in the register portion concerning the foremost segment as the specified emission condition is registered as the emission-condition specified value in the register portion.

With this arrangement, if a user registers the second emission-condition specified value in the register portion, another example (for convenience, hereinafter referred to as the "third emission mode") in the different mode becomes an emission mode in which the foremost segment of the at least two light emission segments forming the emission region is allowed to emit light on the basis of the default emission condition of the foremost segment whereas the subsequent segment is allowed to emit light on the basis of an emission condition differing from the default emission condition of the foremost segment. Therefore, it is possible to realize abundant light-emission variations by means of the level meter, and a user can select the third emission mode by registering the second emission-condition specified value in the register portion.

In one preferred embodiment of the present invention, the method of setting the level meter further includes a third registration step in which a number of the light emission segments forming the emission region is registered in the register portion.

With this arrangement, a user can set the number of light emission segments forming an emission region by registering the number of light emission segments forming an emission region in the register portion. Hence, the emission region is enabled to be formed by various numbers of light emission segments, and therefore it is possible to realize more abundant light-emission variations in the level meter.

In one preferred embodiment of the present invention, the method of setting the level meter further includes a fourth registration step in which the emission proceeding direction is registered in the register portion.

With this arrangement, a user can set the emission proceeding direction by registering the emission proceeding direction in the fourth register portion. Hence, the emission region that moves or spreads in various emission proceeding directions is enabled to be formed, and therefore it is possible to realize more abundant light-emission variations in the level meter.

BRIEF DESCRIPTION OF DRAWINGS

FIG. 4 is a flowchart shown to describe a light emission preparation process performed by a control portion of the level meter.

FIG. 5 is a schematic view of the level meter in which a light emission segment is emitting light in a first light emission mode.

FIG. 6 is a schematic view of the level meter in which a light emission segment is emitting light in a second light emission mode.

DESCRIPTION OF EMBODIMENTS

Figure 1:
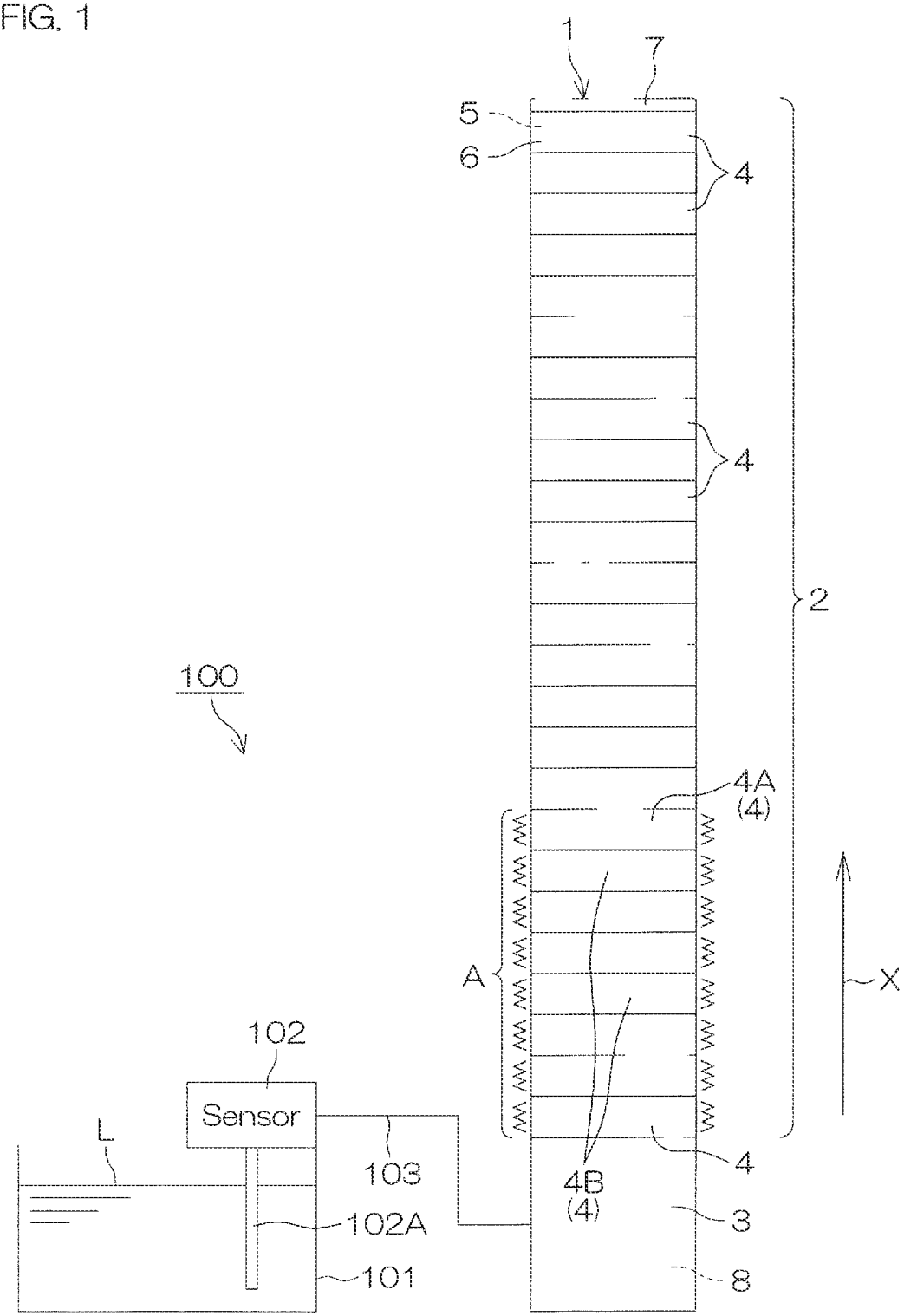
FIG. 1 is a schematic configuration view of a monitoring system that uses a level meter according to a preferred embodiment of the present invention.

FIG. 1 is a schematic configuration view of a monitoring system 100 that uses a level meter 1 according to a preferred embodiment of the present invention. The monitoring system 100 in this preferred embodiment is to monitor a quantity of liquid L that has gathered in a liquid tank 101 installed in a factory or the like, i.e., is to monitor a liquid quantity, and includes a sensor 102 that detects a liquid quantity and the level meter 1 that displays a liquid quantity that is a detection result of the sensor 102. An arbitrary sensor, such as a water level sensor including a probe 102A that is immersed in a liquid L in the liquid tank 101, can be employed as the sensor 102.

The sensor 102 is connected to the level meter 1 through a wired or wireless signal line 103. A detection signal of the sensor 102 concerning the liquid quantity in the liquid tank 101 is input to the level meter 1 through the signal line 103. The monitoring system 100 may additionally include a programmable logic controller (PLC) that controls the entrance and exit of a liquid L, for example, in the liquid tank 101. The PLC (not shown) in that case may be disposed between both ends of the signal line 103 so as to link the sensor 102 and the level meter 1 together, and may transfer the detection signal of the sensor 102 to the level meter 1.

The level meter 1 is fixed to an appropriate place at the periphery of the liquid tank 101. The level meter 1 has a pillar-shaped basic form as a whole. The level meter 1 includes a level display unit 2 and a base 3 that supports the level display unit 2 from below. The level display unit 2 is formed in, for example, a pillar shape (typically, a cylindrical shape) extending in the up-down direction. The level display unit 2 is formed by unifying a plurality of light emission segments 4 arranged in a predetermined array direction with each other. In this preferred embodiment, the array direction of the light emission segments 4 coincides with the up-down direction, and the level display unit 2 includes twenty-five light emission segments 4 stacked together in the up-down direction. The array direction of the light emission segments 4 may be a left-right direction, or may be a curved direction without being limited to a rectilinear direction. In the following description, each of the light emission segments 4 and its height position (position in the array direction) are distinguished by ordinal level numbers in which the lowest light emission segment 4 is defined as a "1st-level" segment and in which the highest light emission segment 4 is defined as a "25th-level" segment.

Each of the light emission segments 4 has, for example, a wholly cylindrical shape that is flat in the up-down direction. Referring to the highest light emission segment 4, each of the light emission segments 4 includes a light source 5 and a cylindrical (for example, circularly cylindrical) glove 6 with which the periphery of the light source 5 is covered. The light source 5 of this preferred embodiment is a full-color or multicolor light source that is capable of emitting light in a plurality of colors, and is formed by, for example, a light emitting diode. The glove 6 of this preferred embodiment is colorless and transparent, or is white and translucent, and outwardly casts light emitted by the light source 5 without changing its color. The emission color of the light source 5 becomes the emission color of the light emission segment 4. The emission color is an example of light emission conditions of the light emission segment 4.

The light emission conditions of the light emission segment 4 also include an emission pattern of the light emission segment 4. In this preferred embodiment, the emission pattern includes lighting, blinking, and flashing. "Blinking" denotes an illumination pattern in which short lighting for a predetermined short period of time and short non-lighting for a predetermined short period of time are periodically repeated. "Flashing" denotes an illumination pattern in which extremely-short lighting for a predetermined extremely-short period of time (lighting shorter in time than blinking) and short non-lighting for a predetermined short period of time subsequent to the extremely-short lighting (non-lighting longer in time than lighting) are periodically repeated. An emission pattern in which emission intensity varies along, for example, a sine curve can be mentioned as another emission pattern. Additionally, in a case in which a plurality of light sources 5 are arranged side by side in a circumferential direction in each of the light emission segments 4, an emission pattern in which light is circulatively moved by allowing the light sources 5 to lighten in turns can also be mentioned. As thus described, each of the light emission segments 4 is capable of emitting light in a plurality of emission colors and in a plurality of emission patterns.

In the level display unit 2, at least one light emission segment 4 emits light, and, as a result, an emission region A is formed, and the emission region A expresses a liquid quantity in the liquid tank 101. In FIG. 1, eight light emission segments 4 consecutive upwardly from a 1st-level light emission segment 4 are in a light emission state, and form the emission region A. The emission region A in this preferred embodiment spreads upwardly along the up-down direction in proportion to an increase in liquid quantity under the assumption that the 1st-level light emission segment 4 is a starting point, and narrows downwardly in proportion to a decrease in liquid quantity. In other words, the upward direction is a predetermined emission proceeding direction X in this preferred embodiment. In a case in which at least two consecutive light emission segments 4 emit light and form the emission region A, the light emission segment 4, which is one of these light emission segments 4 and which is placed on the most downstream side in the emission proceeding direction X, is referred to as a foremost segment 4A, whereas the light emission segment 4, which is one of these light emission segments 4 and which is placed on the more upstream side in the emission proceeding direction X than the foremost segment 4A, is referred to as a subsequent segment 4B. The emission proceeding direction X may be a downward direction under the assumption that the 25th-level emitting light segment is a starting point.

The level meter 1 having the thus formed level display unit 2 is enabled to be also used as a so-called stacked signal lamp. The level display unit 2 additionally includes a disk-shaped top cover 7 with which the highest light emission segment 4 is covered from the upper side.

The base 3 is formed in a pillar shape (for example, cylindrical shape) having a size and a shape each of which matches the level display unit 2. The base 3 has a built-in control unit 8 that controls the light emission of each of the light emission segments 4 in the level display unit 2. The level display unit 2 and the control unit 8 built into the base 3 supporting the level display unit 2 are joined integrally with each other.

Figure 2:
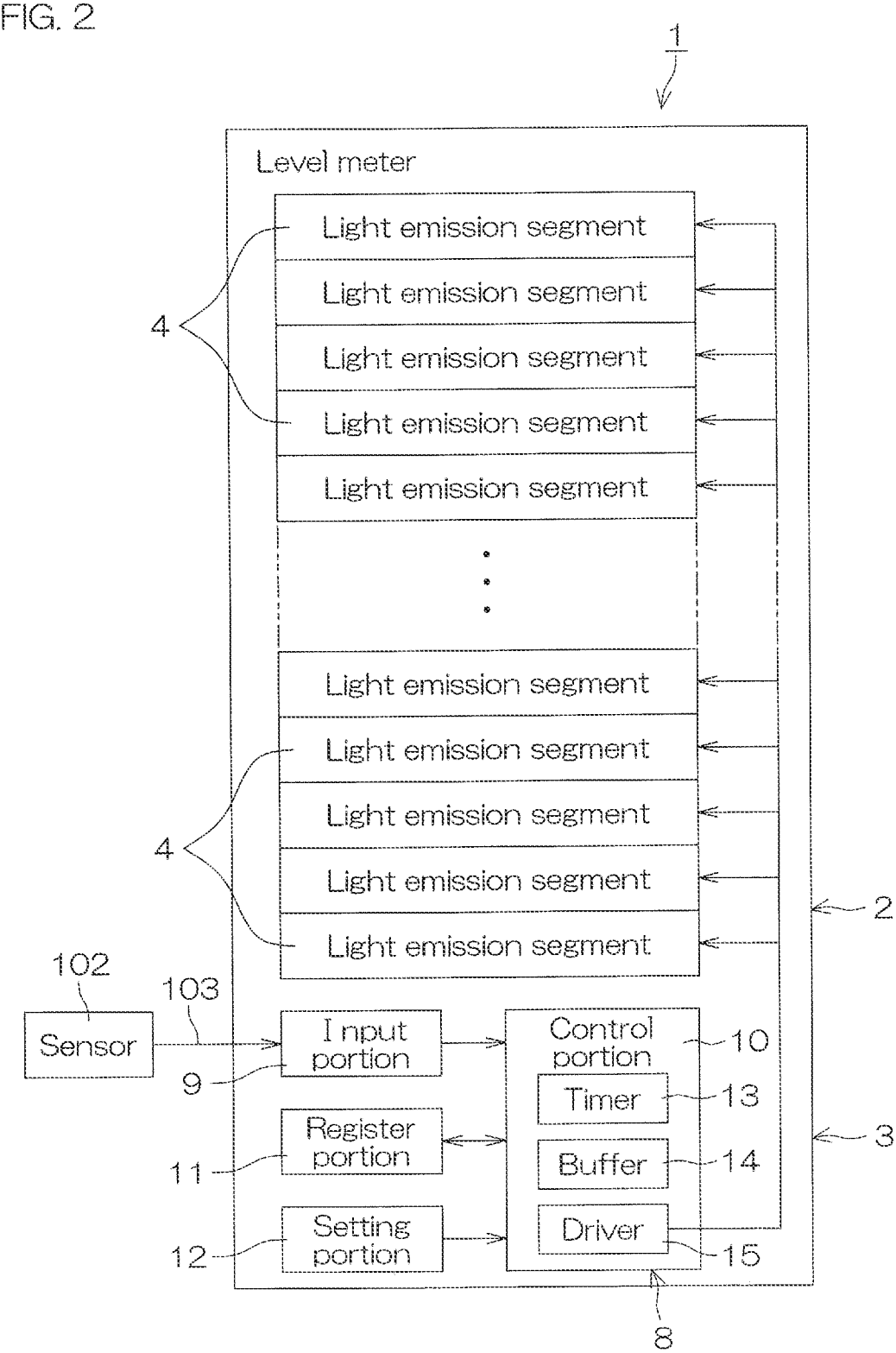
FIG. 2 is a block diagram shown to describe an electrical configuration of the level meter.

FIG. 2 is a block diagram shown to describe an electrical configuration of the level meter 1. The control unit 8 includes an input portion 9 to which a detection signal of the sensor 102 is input, a control portion 10 formed by a CPU (central processing unit), a register portion 11 that is formed by a memory and that stores various pieces of information, and a setting portion 12 that sets various set values in the level display unit 2. The input portion 9 is an interface portion connected to the signal line 103 linking to the sensor 102. The control portion 10 includes a timer 13 for time measurement, a buffer 14 that is a temporary storage device, and a driver 15 electrically connected to the level display unit 2, besides the CPU. The control portion 10 controls the light emission of each of the light emission segments 4 in the level display unit 2 by means of the driver 15.

The register portion 11 stores a set value about default emission conditions of each of the light emission segments 4, a set value about the emission proceeding direction X mentioned above, a set value about the number of light emission segments 4 forming an emission region A in the level display unit 2, and a set value about an emission mode which can be realized by each of the light emission segments 4 of the level display unit 2. The emission mode includes first to third emission modes, and a detailed description of these modes will be given later. The setting portion 12 may be a DIP switch or a touch panel that is disposed on, for example, a surface of the base 3. Alternatively, the setting portion 12 may be a connection terminal connected to the PLC mentioned above or to an external personal computer (not shown), and, in this case, the setting portion 12 receives a set value transferred from the PLC or from the external personal computer. A user can switch the operation mode of the level meter 1 to a mode serving as a level meter and to a mode serving as a stacked signal lamp by operating the setting portion 12, etc. It should be noted that the operation mode of the level meter 1 in the following description is in a mode serving as a level meter.

Figure 3:
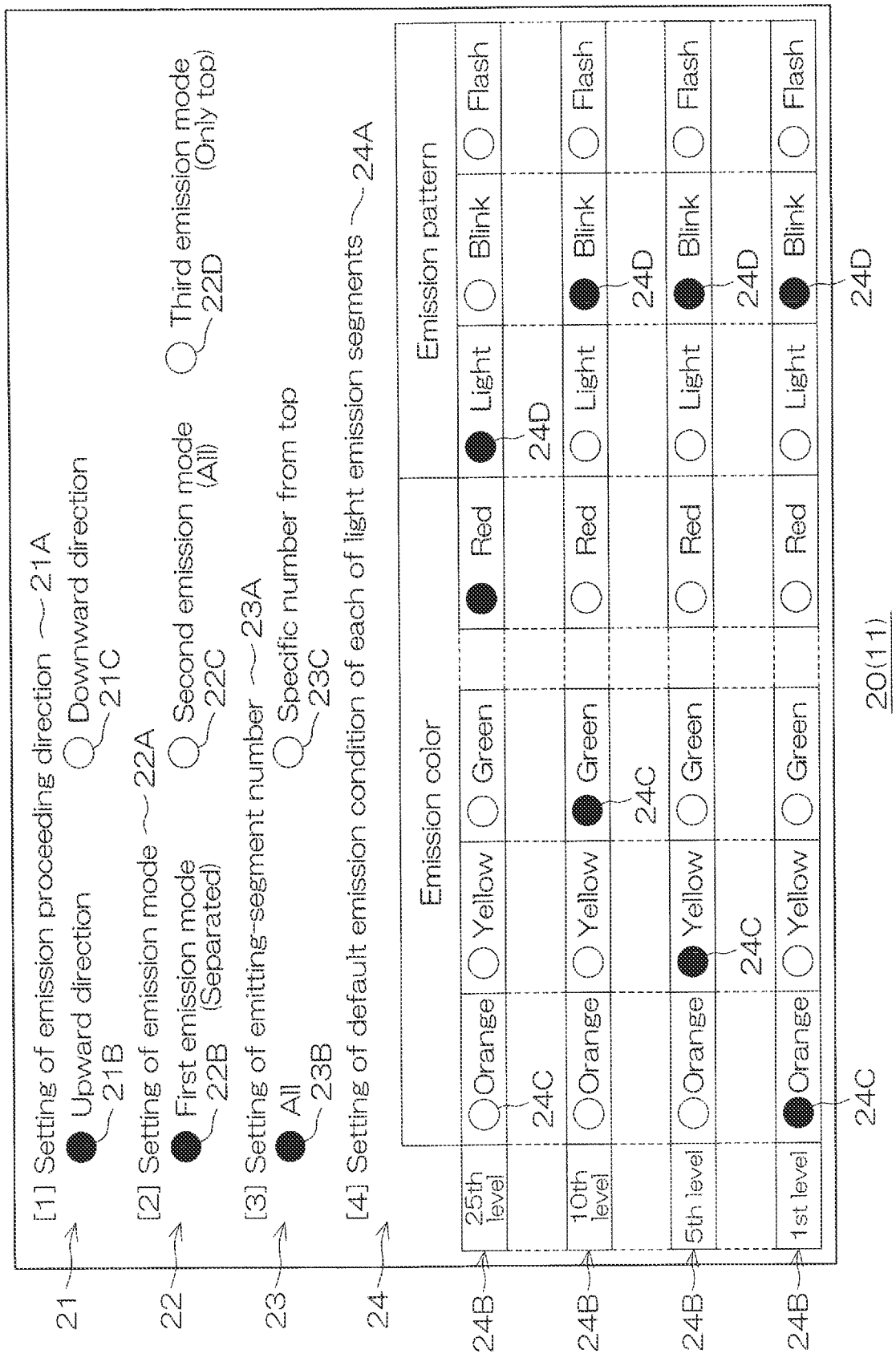
FIG. 3 is a view showing a setting screen used to set the level meter.

FIG. 3 shows a setting screen 20 used to set the level meter 1. The setting screen 20 is displayed on the touch panel mentioned above, a personal computer, etc. A first setting section 21 to set the emission proceeding direction X, a second setting section 22 to set an emission mode of the light emission segment 4, a third setting section 23 to set a number of light emission segments 4 forming an emission region A (hereinafter, referred to as an "emitting-segment number"), and a fourth setting section 24 to set a default emission condition of each of the light emission segments 4 are displayed on the setting screen 20.

A title 21A, a check section 21B to select the upward direction as the emission proceeding direction X, and a check section 21C to select the downward direction as the emission proceeding direction X are displayed in the first setting section 21. A title 22A, a check section 22B to select a first emission mode, a check section 22C to select a second emission mode, and a check section 22D to select a third emission mode are displayed in the second setting section 22.

The first emission mode is an emission mode in which, in a case in which a plurality of light emission segments 4 are allowed to emit light, and form an emission region A, all of these light emission segments 4 are allowed to emit light on the basis of a default emission condition of each of the light emission segments 4. The second and third emission modes are other emission modes in which the foremost segment 4A is allowed to emit light on the basis of a default emission condition of the foremost segment 4A whereas the subsequent segment 4B is allowed to emit light on the basis of a specified emission condition while applying a predetermined specified emission condition without applying a default emission condition of the subsequent segment 4B. The first to third emission modes will be described later while citing concrete examples.

A title 23A, a check section 23B to select the number of all of from the foremost segment 4A to the 1st-level light emission segment 4 as an emitting-segment number, and a check section 23C to select a specific number of light emission segments 4 from the foremost segment 4A as an emitting-segment number are displayed in the third setting section 23. The foremost segment 4A may be or may not be included in the specific number of light emission segments 4. An input section used to input this specific number may also be displayed in the third setting section 23.

A title 24A and an individual selection section 24B to select a default emission condition about each of the light emission segments 4 from the 1st level to the 25th level are displayed in the fourth setting section 24. The default emission condition includes emission color specification and emission pattern specification. Therefore, a plurality of check sections 24C provided for each selectable emission color and a plurality of check sections 24D provided for each selectable emission pattern are displayed in each of the individual selection sections 24B.

The user performs the initial setting of the level meter 1 by operating the touch panel, or the personal computer, or the like on which the setting screen 20 is displayed. In detail, the user places a checkmark (in FIG. 3, a black circle) in the check section 21B or 21C so as to set the emission proceeding direction X. The user places a checkmark in any one of the check sections 22B to 22D so as to set the emission mode. The user places a checkmark in the check section 23B or 23C so as to set an emitting-segment number. In each of the individual selection sections 24B, the user places a checkmark in any one of the check sections 24C, and places a checkmark in any one of the check sections 24D, thus setting the default emission condition of each of the light emission segments 4. Each of the set values of the emission proceeding direction X, the emission mode, the emitting-segment number, and the default emission condition that have thus been set by the user is registered in the register portion 11 by means of the control portion 10. In other words, the contents of the set values registered in the register portion 11 are substantially the same as the contents of the setting screen 20.

The register portion 11 in which the default emission condition of each of the light emission segments 4 is registered functions as a first register portion. In a case in which the user has placed a checkmark in the check section 22C or 22D in setting the emission mode, an emission-condition command value that indicates a command to apply a specified emission condition without applying a default emission condition concerning the subsequent segment 4B is registered in the register portion 11. The register portion 11 in this case functions as a second register portion. Additionally, the register portion 11 in which an emitting-segment number is registered functions as a third register portion, and the register portion 11 in which an emission proceeding direction is registered functions as a fourth register portion. The register portion 11 may be formed so as to be partitioned into the first register portion, the second register portion, the third register portion, and the fourth register portion that are separated from each other.

In a method of setting the level meter 1 described above, a first registration step in which a default emission condition of each of the light emission segments 4 is registered in the register portion 11, a second registration step in which an emission-condition specified value is registered in the register portion 11, a third registration step in which an emitting-segment number is registered in the register portion 11, and a fourth registration step in which an emission proceeding direction is registered in the register portion 11 may be performed in this order, or may be performed in another order.

Additionally, the emission-condition specified value when the user inputs a checkmark into the check section 22C in order to select the second emission mode in the second registration step is registered in the register portion 11 as a first emission-condition specified value for using the default emission condition registered in the register portion 11 concerning the foremost segment 4A as a specified emission condition. A selection section (not shown) to select one or both of the emission color and the emission pattern in the default emission condition of the foremost segment 4A as a specified emission condition may be disposed around the check section 22C. The emission-condition specified value when the user inputs a checkmark into the check section 22D in order to select the third emission mode in the second registration step is registered in the register portion 11 as a second emission-condition specified value for using an emission condition differing from the default emission condition registered in the register portion 11 concerning the foremost segment 4A as a specified emission condition. A selection section (not shown) to select one or both of the emission color and the emission pattern as an emission condition differing from the default emission condition of the foremost segment 4A may be disposed around the check section 22D. On the other hand, in a case in which the user has placed a checkmark in the check section 22B in order to select the first emission mode in setting the emission mode, an emission-condition specified value is not yet registered in the register portion 11.

The control portion 10 controls the light emission of each of the light emission segments 4 on the basis of the registration contents of the register portion 11. FIG. 4 is a flowchart shown to describe a process example performed by the control portion 10 of the level meter 1. In the level meter 1, whenever a detection signal of the sensor 102 is input to the input portion 9, the control portion 10 identifies both an emission region A corresponding to this detection signal and light emission segments 4 that are to emit light for forming this emission region A, and then performs a light emission preparation process shown in FIG. 4.

In the light emission preparation process, first, the control portion 10 obtains the position of the foremost segment 4A in the light emission segments 4 that are to form the emission region A (step S1). The position of each of the light emission segments 4 is the ordinal level number mentioned above, and is stored in the register portion 11 (see FIG. 3). The other light emission segments 4 positioned below the foremost segment 4A are subsequent segments 4B.

Thereafter, the control portion 10 obtains the default emission condition of each of the foremost segment 4A and the subsequent segments 4B with reference to the register portion 11 (step S2), and sets these emission conditions in the buffer 14 (step S3). Thereafter, the control portion 10 ascertains the emission mode set at the present time with reference to the register portion 11 (step S4).

If the emission mode set at the present time is the first emission mode (YES in step S4), the control portion 10 ends the light emission preparation process, and operates the driver 15, and allows the light emission segments 4 that are to form the emission region A to emit light on the basis of the emission condition set in the buffer 14. Thus, each of the light emission segments 4 that are to form the emission region A emits light in an emission color and in an emission pattern on a default emission condition set for each of the light emission segments 4 (see FIG. 5). In FIG. 5, all of the twenty-five light emission segments 4 emit light, and form an emission region A, and the emission colors of these light emission segments 4 become gradually different from each other in proportion to the proceeding to the downstream side in the emission proceeding direction X so that the entirety of the emission region A forms a gradation. The first emission mode in which each of the light emission segments 4 emits light in this way on the default emission condition set for each light emission segment may be referred to as "Separated." If the emission mode is the first emission mode in which an emission-condition specified value is not yet registered in the register portion 11, the control portion 10 allows all of the light emission segments 4 forming the emission region A to emit light on the basis of the default emission condition. Thereafter, the control portion 10 that has allowed the light emission segments 4 to emit light clears data stored in the buffer 14, and stands ready for the input of a following detection signal from the sensor 102.

If the emission mode set at the present time is the second emission mode (NO in step S4, YES in step S5), the control portion 10 updates the emission condition in the buffer 14 so that the emission condition of the subsequent segment 4B set in the buffer 14 is overwritten with the default emission condition of the foremost segment 4A (step S6). The emission condition of the subsequent segment 4B that has been overwritten is the specified emission condition mentioned above. As thus described, if the emission mode is the second emission mode in which the first emission-condition specified value is registered in the register portion 11, the control portion 10 sets, as the specified emission condition, the default emission condition registered in the register portion 11 concerning the foremost segment 4A of the light emission segments 4 (at least two light emission segments 4) forming the emission region A. Therefore, the specified emission condition is determined depending on the default emission condition of the foremost segment 4A registered in the register portion 11.

Thereafter, the control portion 10 ends the light emission preparation process, and allows the light emission segments 4 that are to form the emission region A to emit light on the basis of the emission condition set in the buffer 14. In detail, the control portion 10 allows the foremost segment 4A to emit light on the basis of the default emission condition, whereas the control portion 10 allows the subsequent segment 4B to emit light on the basis of the specified emission condition. The specified emission condition in the second emission mode includes emission color specification and emission pattern specification. Thus, the foremost segment 4A of the light emission segments 4 that are to form the emission region A emits light in the emission color and in the emission pattern on the default emission condition set for the foremost segment 4A, and the subsequent segment 4B likewise emits light on the specified emission condition, i.e., emits light in the emission color and in the emission pattern based on the default emission condition set for the foremost segment 4A (see FIG. 6). In other words, the subsequent segment 4B emits light in the manner of the foremost segment 4A.

In FIG. 6, ten light emission segments 4 emit light, and form an emission region A, and all of these light emission segments 4 emit light in a green emission color in the default emission condition set for the 10th-level foremost segment 4A (see FIG. 3), and blink in accordance with an emission pattern in the default emission condition set for the foremost segment 4A. The second emission mode in which all of the light emission segments 4 forming the emission region A emit light in this way on the default emission condition set for the foremost segment 4A may be referred to as "All." Thereafter, the control portion 10 that has allowed the light emission segments 4 to emit light clears data stored in the buffer 14, and stands ready for the input of a following detection signal from the sensor 102.

If the emission mode set at the present time is the third emission mode (NO in step S4, NO in step S5), the control portion 10 updates the emission condition in the buffer 14 so that the emission condition of the subsequent segment 4B set in the buffer 14 is overwritten with an emission condition differing from the default emission condition of the foremost segment 4A (step S7). The emission condition of the subsequent segment 4B that has been overwritten is the specified emission condition mentioned above.

As thus described, if the emission mode is the third emission mode in which the second emission-condition specified value is registered in the register portion 11, the control portion 10 sets, as the specified emission condition, an emission condition differing from the default emission condition registered in the register portion 11 concerning the foremost segment 4A of the light emission segments 4 (at least two light emission segments) forming the emission region A. Therefore, the specified emission condition is determined depending on the default emission condition of the foremost segment 4A registered in the register portion 11. In detail, the control portion 10 sets, as the specified emission condition, an emission condition in which at least one of an emission color and an emission pattern differs from the emission color and the emission pattern that are specified by the default emission condition registered in the register portion 11 concerning the foremost segment 4A. As an example, if the emission pattern in each default emission condition of the foremost segment 4A and the subsequent segment 4B is "Blinking," the control portion 10 overwrites the emission pattern of the subsequent segment 4B on the buffer 14 with "Lighting" in step S7 of FIG. 4.

Thereafter, the control portion 10 ends the light emission preparation process, and allows the light emission segments 4 that are to form the emission region A to emit light on the basis of the emission condition set in the buffer 14. In detail, the control portion 10 allows the foremost segment 4A to emit light on the basis of the default emission condition, whereas the control portion 10 allows the subsequent segment 4B to emit light on the basis of the specified emission condition. Thus, the foremost segment 4A of the light emission segments 4 that are to form the emission region A emits light in the emission color and in the emission pattern on the default emission condition set for the foremost segment 4A, and the subsequent segment 4B emits light on the specified emission condition (see FIG. 7).

Figure 7:
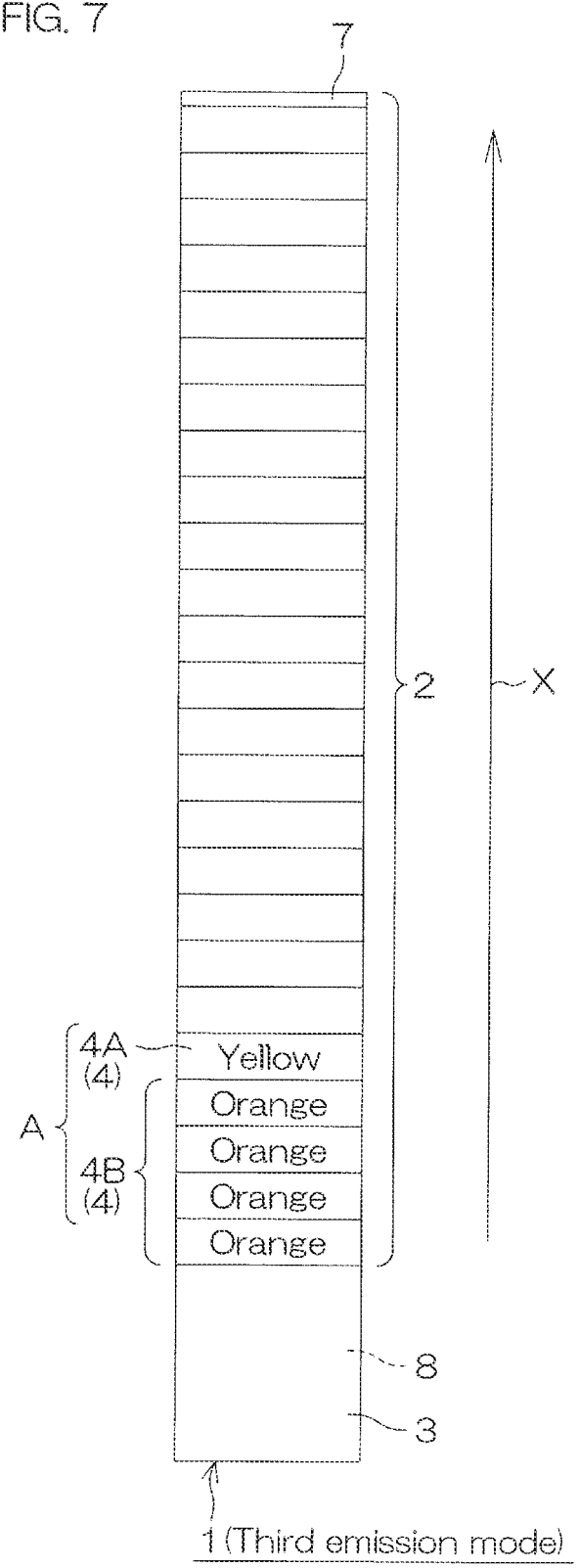
FIG. 7 is a schematic view of the level meter in which a light emission segment is emitting light in a third light emission mode.

In FIG. 7, five light emission segments 4 emit light, and form an emission region A, and the 5th-level foremost segment 4A of these light emission segments 4 blinks in a yellow color in accordance with the default emission condition (see FIG. 3) set for the foremost segment 4A, and the subsequent segments 4B light unlike the foremost segment 4A although the subsequent segments 4B emit light in an orange color that is the emission color in the default emission condition set for these segments. The third emission mode in which the foremost segment 4A is allowed to emit light on the default emission condition and in which, on the other hand, the subsequent segments 4B are allowed to emit light on the default emission condition differing from that of the foremost segment 4A in this way may be referred to as "Only top." The emission pattern of the foremost segment 4A may be not "blinking" but "flashing." The control portion 10 that has allowed the light emission segments 4 to emit light in this way clears data stored in the buffer 14, and stands ready for the input of a following detection signal from the sensor 102.

As thus described, according to this preferred embodiment, in the first emission mode that is a default emission mode, the level meter 1 is enabled to allow all of the light emission segments 4 forming the emission region A to emit light on the basis of the default emission condition registered in the register portion 11 concerning each of the light emission segments 4 (see FIG. 5). Additionally, in the other modes differing from the first emission mode, the level meter 1 is enabled to allow the foremost segment 4A of at least two light emission segments 4 forming an emission region A to emit light on the basis of the default emission condition whereas the level meter 1 is enabled to allow the subsequent segment 4B to emit light on the basis of the specified emission condition according to the emission-condition specified value registered in the register portion 11.

One other mode whose specified emission condition is the same as the default emission condition is the second emission mode (see FIG. 6), and one other mode whose specified emission condition is different from the default emission condition is the third emission mode (see FIG. 7). The second emission mode is an emission mode in which all of the foremost segment 4A and the subsequent segments 4B are allowed to emit light on the basis of the default emission condition of the foremost segment 4A. In other words, in the second emission mode, the level meter 1 is enabled to allow all of the foremost segment 4A and the subsequent segments 4B forming the emission region A to emit light in the emission color and the emission pattern that are those of the default concerning the foremost segment 4A.

The third emission mode is an emission mode in which the foremost segment 4A is allowed to emit light on the basis of the default emission condition whereas the subsequent segment 4B is allowed to emit light on the basis of the emission condition differing from the default emission condition of the foremost segment 4A. In other words, in the third emission mode, the level meter 1 is enabled to allow the foremost segment 4A to emit light in the emission color and the emission pattern that are those of the default concerning the foremost segment 4A, and is enabled to allow the subsequent segment 4B to emit light on an emission condition in which at least one of an emission color and an emission pattern differs from the emission color and the emission pattern that are those of the default emission condition concerning the foremost segment 4A. As thus described, the level meter 1 is enabled to allow the light emission segments 4 forming the emission region A to emit light not only in the first emission mode but also in the second or third emission mode, and therefore it is possible to realize abundant light-emission variations.

Additionally, in the level meter 1, the user can select an emission mode by placing a checkmark in the check sections 22B to 22D of the setting screen 20 (see FIG. 3) to register an emission-condition specified value in the register portion 11. Particularly, the user can select the second emission mode by placing a checkmark in the check section 22C to register a first emission-condition specified value in the register portion 11. Additionally, the user can select the third emission mode by placing a checkmark in the check section 22D to register a second emission-condition specified value in the register portion 11. Particularly, the level meter 1 is enabled to realize abundant light-emission variations by the simple operation of allowing the user to place a checkmark in any one of the check sections 22B to 22D. In the setting of a conventional level meter, all emission conditions of each moment of each of the light emission segments for realizing an emission mode have been required to be registered in chronological order, and therefore a heavy burden has been imposed on users, and yet, in the level meter 1, the user is released from such a burden. Therefore, it is possible to provide a setting method capable of easily realizing abundant light-emission variations by means of the level meter 1.

Additionally, the user can set the number of light emission segments 4 forming an emission region A by placing a checkmark in the check section 23B or 23C (see FIG. 3) of the setting screen 20 so as to register an emitting-segment number in the register portion 11. Hence, an emission region A is formed by various numbers of light emission segments 4 in the level meter 1, and therefore it is possible to provide a level meter 1 capable of realizing more abundant light-emission variations.

Still additionally, the user can set an emission proceeding direction X by placing a checkmark in the check section 21B or 21C (see FIG. 3) of the setting screen 20 so as to register the emission proceeding direction X in the register portion 11. This makes it possible to form an emission region A that moves or spreads in various emission proceeding directions X (in this preferred embodiment, in the upward direction or in the downward direction), thus making it possible to provide a level meter 1 capable of realizing more abundant light-emission variations.

Additionally, the level display unit 2 and the control unit 8 are united together in this preferred embodiment, and yet, as a modification, the level display unit 2 and the control unit 8 may be communicably connected together through a communication line (not shown) in a state of being separated from each other. In this case, the user can also select the emission mode of the light emission segments 4 forming the emission region A through a remote operation by registering an emission-condition specified value in the register portion 11 of the control unit 8 separated from the level display unit 2.

Although the preferred embodiment of the present invention has been described above, the present invention can be embodied in yet other modes.

For example, in the aforementioned preferred embodiment, the control portion 10 of the level meter 1 controls the light emission of the light emission segments 4 so that an emission region A spreads in the emission proceeding direction X in accordance with an increase in the liquid quantity that is the numerical quantity to be displayed. Instead of this, the control portion 10 may control the light emission of the light emission segment 4 so that the emission region A moves in the emission proceeding direction X in accordance with an increase in the liquid quantity. The emission region A in this case is formed by a specific number of light emission segments 4 that are set by placing a checkmark in the check section 23C of the setting screen 20 (see FIG. 3). Additionally, the control portion 10 may control the light emission of the light emission segments 4 so that the emission region A spreads or moves in the emission proceeding direction X in accordance with a decrease in the liquid quantity.

Additionally, only one level meter 1 exists as described in the aforementioned preferred embodiment, and yet, for example, a plurality of level meters 1 may be disposed in a factory, and the initial setting in these level meters 1 may be collectively performed in the setting screen 20. These level meters 1 that have undergone the initial setting may be the same in the emission mode, or may differ from each other in the emission mode. Additionally, the initial setting of the level meter 1 may be performed not by the setting screen 20 but by the DIP switch mentioned above or the like.

Additionally, although the emission region A of the level meter 1 expresses the liquid quantity in the liquid tank 101 detected by the sensor 102 in the aforementioned preferred embodiment, an object to be monitored by the monitoring system 100 may be an arbitrary numerical quantity (number and quantity) without being limited to the liquid quantity. Therefore, the emission region A may express, for example, lapsed time or the like that is measured by the timer 13.

Various features described above can be appropriately combined together.

Although the preferred embodiments of the present invention have been described in detail, these embodiments are merely concrete examples used to clarify the technical contents of the present invention, and the present invention should not be understood by being limited to these concrete examples, and the scope of the present invention is limited solely by the appended claims.

REFERENCE SIGNS LIST

1 . . . level meter
2 . . . level display unit
4 . . . light emission segment
4A . . . foremost segment
4B . . . subsequent segment
8 . . . control unit
10 . . . control portion
11 . . . register portion
A . . . emission region
X . . . emission proceeding direction

The invention claimed is:

1. A level meter comprising:
a plurality of light emission segments that are arranged in a predetermined array direction and that form an emission region by allowing at least one light emission segment to emit light;
a first register portion in which a default emission condition concerning each of the light emission segments is registered;
a second register portion in which, when the emission region is formed by allowing at least two of the light emission segments consecutively arranged in the array direction to emit light, an emission-condition specified value that indicates a command to apply a predetermined specified emission condition without applying the default emission condition is registered concerning a subsequent segment positioned on a more upstream side in a predetermined emission proceeding direction than a foremost segment positioned on a most downstream side in the emission proceeding direction in the at least two light emission segments forming the emission region; and
a control portion that controls light emission of the light emission segment on a basis of registration contents of the first and second register portions so that the emission region moves or spreads in the emission proceeding direction along the array direction in accordance with an increase or a decrease in numerical quantity to be expressed by the emission region, wherein
the control portion allows all of the light emission segments forming the emission region to emit light on a basis of the default emission condition and allows the foremost segment to emit light on a basis of the default emission condition while allowing the subsequent segment to emit light on a basis of the specified emission condition.

2. The level meter according to claim 1, further comprising a third register portion in which a number of the light emission segments forming the emission region is registered.

3. The level meter according to claim 1, further comprising a fourth register portion in which the emission proceeding direction is registered.

4. The level meter according to claim 1, comprising a level display unit including the light emission segments united together and a control unit including the first register portion, the second register portion, and the control portion, wherein the level display unit and the control unit are joined integrally with each other.

5. The level meter according to claim 1, comprising a level display unit including the light emission segments united together and a control unit including the first register portion, the second register portion, and the control portion, the level display unit and the control unit being separated from each other, wherein
the level display unit and the control unit are communicably connected to each other.

6. The level meter according to claim 1, wherein, if the emission-condition specified value is not yet registered in the second register portion, the control portion allows all of the light emission segments forming the emission region to emit light on a basis of the default emission condition, and
if the emission-condition specified value is registered in the second register portion, the control portion allows the foremost segment to emit light on a basis of the default emission condition whereas the control portion allows the subsequent segment to emit light on a basis of the specified emission condition.

7. The level meter according to claim 6, wherein the specified emission condition is determined depending on the default emission condition registered in the first register portion concerning the foremost segment.

8. The level meter according to claim 7, wherein a first emission-condition specified value indicating to use the default emission condition registered in the first register portion concerning the foremost segment as the specified emission condition is registerable in the second register portion, and
if the first emission-condition specified value is registered in the second register portion, the control portion sets, as the specified emission condition, the default emission condition registered in the first register portion concerning the foremost segment of the at least two light emission segments forming the emission region.

9. The level meter according to claim 8, wherein the light emission segment is configured to emit light in a plurality of emission colors and in a plurality of emission patterns, and
each of the default emission condition and the specified emission condition includes emission color specification and emission pattern specification.

10. The level meter according to claim 7, wherein a second emission-condition specified value indicating to use an emission condition differing from the default emission condition registered in the first register portion concerning the foremost segment as the specified emission condition is registerable as the emission-condition specified value in the second register portion, and
if the second emission-condition specified value is registered in the second register portion, the control portion sets, as the specified emission condition, an emission condition differing from the default emission condition registered in the first register portion concerning the foremost segment of the at least two light emission segments forming the emission region.

11. The level meter according to claim 10, wherein the light emission segment is configured to emit light in a plurality of emission colors and in a plurality of emission patterns, each of the default emission condition and the specified emission condition includes emission color specification and emission pattern specification, and the control portion sets, as the specified emission condition, an emission condition, in which at least one of an emission color and an emission pattern differs from an emission color and an emission pattern that are specified by the default emission condition registered in the first register portion concerning the foremost segment.

12. A method of setting a level meter, the level meter comprising:

a plurality of light emission segments that are arranged in a predetermined array direction and that form an emission region by allowing at least one light emission segment to emit light;

a register portion in which an emission condition of the light emission segments is registered; and a control portion that controls light emission of the light emission segment on a basis of registration contents of the register portion so that the emission region moves or spreads in a predetermined emission proceeding direction along the array direction in accordance with an increase or a decrease in numerical quantity to be expressed by the emission region;

the method comprising:

a first registration step in which a default emission condition concerning each of the light emission segments is registered in the register portion; and a second registration step in which, when the emission region is formed by allowing at least two of the light emission segments consecutively arranged in the array direction to emit light, an emission-condition specified value that indicates a command to apply a predetermined specified emission condition without applying the default emission condition is registered in the register portion concerning a subsequent segment positioned on a more upstream side in the emission proceeding direction than a foremost segment positioned on a most downstream side in the emission proceeding direction in the at least two light emission segments forming the emission region.

13. The method of setting a level meter according to claim 12, wherein the light emission segment is configured to emit light in a plurality of emission colors and in a plurality of emission patterns, and each of the default emission condition and the specified emission condition includes emission color specification and emission pattern specification.

14. The method of setting a level meter according to claim 12, wherein, in the second registration step, a first emission-condition specified value indicating to use the default emission condition registered in the register portion concerning the foremost segment as the specified emission condition is registered as the emission-condition specified value in the register portion.

15. The method of setting a level meter according to claim 12, wherein, in the second registration step, a second emission-condition specified value indicating to use an emission condition differing from the default emission condition registered in the register portion concerning the foremost segment as the specified emission condition is registered as the emission-condition specified value in the register portion.

16. The method of setting a level meter according to claim 12, further comprising a third registration step in which a number of the light emission segments forming the emission region is registered in the register portion.

17. The method of setting a level meter according to claim 12, further comprising a fourth registration step in which the emission proceeding direction is registered in the register portion.

* * * * *